US011797371B2

United States Patent
Chen

(10) Patent No.: US 11,797,371 B2
(45) Date of Patent: Oct. 24, 2023

(54) METHOD AND DEVICE FOR DETERMINING FAIL BIT REPAIR SCHEME

(71) Applicant: CHANGXIN MEMORY TECHNOLOGIES, INC., Hefei (CN)

(72) Inventor: Yui-Lang Chen, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 49 days.

(21) Appl. No.: 17/462,042

(22) Filed: Aug. 31, 2021

(65) Prior Publication Data
US 2022/0058080 A1 Feb. 24, 2022

Related U.S. Application Data

(63) Continuation of application No. PCT/CN2021/099146, filed on Jun. 9, 2021.

(30) Foreign Application Priority Data

Aug. 18, 2020 (CN) .......................... 202010832380.0

(51) Int. Cl.
*G06F 11/00* (2006.01)
*G06F 11/07* (2006.01)

(52) U.S. Cl.
CPC ...... *G06F 11/0793* (2013.01); *G06F 11/0727* (2013.01); *G06F 11/0751* (2013.01)

(58) Field of Classification Search
CPC ............. G06F 11/0793; G06F 11/0727; G06F 11/0751

(Continued)

(56) References Cited

U.S. PATENT DOCUMENTS 6,067,259 A 5/2000 Handa
6,535,993 B1 3/2003 Hamada
(Continued)

FOREIGN PATENT DOCUMENTS

CN 1195814 A 10/1998
CN 1366308 A 8/2002
(Continued)

OTHER PUBLICATIONS

Supplementary European Search Report in the European application No. 21773439.1, dated Jun. 27, 2022, 8 pgs.
(Continued)

*Primary Examiner* — Sarai E Butler
(74) *Attorney, Agent, or Firm* — Cooper Legal Group, LLC

(57) ABSTRACT

A method for determining a Fail Bit (FB) repair scheme includes: a bank to be repaired of a chip to be repaired is determined, the bank to be repaired including multiple target repair areas; initial repair processing is performed on an FB in each of the target repair areas using a redundant circuit; responsive to that a number of remaining Redundant Word Lines (RWLs) is greater than 0 and a number of remaining Redundant Bit Lines (RBLs) is greater than 0, a candidate repair sub-scheme for each target repair area is determined, and a candidate repair cost corresponding to each candidate repair sub-scheme is determined; and a target repair scheme for the bank to be repaired is determined according to respective candidate repair sub-schemes and candidate repair costs, where the target repair scheme corresponds to a minimum integrated repair cost.

19 Claims, 11 Drawing Sheets

(58) Field of Classification Search
USPC ..................................................... 714/1–57
See application file for complete search history.

(56) References Cited

U.S. PATENT DOCUMENTS

| | | | |
|---|---|---|---|
| 6,741,509 B2 | 5/2004 | Kato | |
| 6,876,588 B2 | 4/2005 | Kato | |
| 7,079,432 B2 | 7/2006 | Kato | |
| 7,127,647 B1 | 10/2006 | Zorian | |
| 7,224,596 B2 | 5/2007 | Jeong | |
| 10,446,253 B2 | 10/2019 | Choi | |
| 2001/0009521 A1 | 7/2001 | Hidaka | |
| 2001/0026486 A1 | 10/2001 | Ogawa | |
| 2002/0001896 A1* | 1/2002 | Yoon | G11C 29/808 438/200 |
| 2002/0114198 A1 | 8/2002 | Kato | |
| 2002/0191454 A1 | 12/2002 | Beer | |
| 2003/0164510 A1* | 9/2003 | Dono | G11C 29/785 257/200 |
| 2003/0191991 A1 | 10/2003 | Hsu | |
| 2004/0062134 A1 | 4/2004 | Kato | |
| 2004/0210803 A1* | 10/2004 | Cheng | G11C 29/4401 714/710 |
| 2005/0039073 A1* | 2/2005 | Hartmann | G11C 29/44 714/6.2 |
| 2005/0122802 A1 | 6/2005 | Kato | |
| 2006/0090058 A1* | 4/2006 | Chng | G06F 3/0605 711/173 |
| 2006/0098503 A1 | 5/2006 | Jeong | |
| 2007/0247937 A1* | 10/2007 | Moriyama | G11C 29/56008 365/200 |
| 2009/0119537 A1 | 5/2009 | Lee | |
| 2009/0316469 A1 | 12/2009 | Rodriguez | |
| 2009/0319839 A1 | 12/2009 | Surulivel | |
| 2010/0157656 A1 | 6/2010 | Tsuchida | |
| 2010/0169705 A1* | 7/2010 | Fujii | G11C 29/72 714/719 |
| 2010/0290299 A1 | 11/2010 | Matsumoto | |
| 2010/0322024 A1 | 12/2010 | Yagishita | |
| 2011/0002169 A1 | 1/2011 | Li | |
| 2011/0090751 A1 | 4/2011 | Manna | |
| 2011/0199845 A1 | 8/2011 | Yang | |
| 2012/0173932 A1* | 7/2012 | Li | G06F 11/1076 714/42 |
| 2012/0206973 A1 | 8/2012 | He | |
| 2012/0257467 A1 | 10/2012 | Kosugi | |
| 2012/0275249 A1 | 11/2012 | Yang | |
| 2012/0297245 A1 | 11/2012 | Li | |
| 2013/0173970 A1 | 7/2013 | Kleveland | |
| 2014/0146613 A1 | 5/2014 | Yang et al. | |
| 2014/0219023 A1 | 8/2014 | Li et al. | |
| 2015/0066417 A1 | 3/2015 | Kimura | |
| 2015/0178614 A1 | 6/2015 | Lin | |
| 2015/0248322 A1* | 9/2015 | Hara | G06F 11/0775 714/53 |
| 2016/0005452 A1 | 1/2016 | Bae | |
| 2016/0307645 A1* | 10/2016 | Kim | G11C 29/76 |
| 2016/0351276 A1 | 12/2016 | Shim | |
| 2017/0110206 A1 | 4/2017 | Ryu et al. | |
| 2017/0133108 A1 | 5/2017 | Lee | |
| 2018/0182467 A1 | 6/2018 | Kang et al. | |
| 2019/0164621 A1 | 5/2019 | Kim | |
| 2019/0237154 A1* | 8/2019 | Choi | G11C 29/783 |
| 2019/0287641 A1 | 9/2019 | Ko | |
| 2019/0348100 A1 | 11/2019 | Smith et al. | |
| 2019/0348102 A1* | 11/2019 | Smith | G11C 11/406 |
| 2020/0152285 A1 | 5/2020 | Nakaoka | |
| 2020/0243159 A1 | 7/2020 | Kang et al. | |
| 2022/0058079 A1 | 2/2022 | Chen | |
| 2022/0058080 A1 | 2/2022 | Chen | |
| 2022/0059182 A1 | 2/2022 | Chen | |
| 2022/0270668 A1 | 8/2022 | Li et al. | |
| 2022/0310187 A1 | 9/2022 | Chen | |
| 2022/0317908 A1 | 10/2022 | Chen | |

FOREIGN PATENT DOCUMENTS

| | | |
|---|---|---|
| CN | 1404140 A | 3/2003 |
| CN | 1409323 A | 4/2003 |
| CN | 1467746 A | 1/2004 |
| CN | 101329918 A | 12/2008 |
| CN | 101331554 A | 12/2008 |
| CN | 101630337 A | 1/2010 |
| CN | 101765889 A | 6/2010 |
| CN | 102157203 A | 8/2011 |
| CN | 101765889 B | 12/2013 |
| CN | 103473160 A | 12/2013 |
| CN | 103688247 A | 3/2014 |
| CN | 103871447 A | 6/2014 |
| CN | 105787817 A | 7/2016 |
| CN | 105989899 A | 10/2016 |
| CN | 109753374 A | 5/2019 |
| CN | 110010187 A | 7/2019 |
| CN | 110364214 A | 10/2019 |
| CN | 110556157 A | 12/2019 |
| CN | 110797071 A | 2/2020 |
| CN | 110797072 A | 2/2020 |
| CN | 110879931 A | 3/2020 |
| CN | 110968985 A | 4/2020 |
| CN | 111312321 A | 6/2020 |
| CN | 112216621 A | 1/2021 |
| CN | 112885398 A | 6/2021 |
| CN | 112908402 A | 6/2021 |
| CN | 112908403 A | 6/2021 |
| EP | 1217524 A2 | 6/2002 |
| JP | 2000048596 A | 2/2000 |
| JP | 2008084409 A | 4/2008 |
| KR | 100795520 B1 | 1/2008 |
| KR | 20160016422 A | 2/2016 |
| KR | 20190093358 A | 8/2019 |
| TW | 376558 B | 12/1999 |
| TW | 470964 B | 1/2002 |
| TW | 201110132 A | 3/2011 |
| TW | 201642273 A | 12/2016 |

OTHER PUBLICATIONS

International Search Report in the international application No. PCT/CN2021/099159, dated Sep. 8, 2021, 2 pgs.
International Search Report in the international application No. PCT/CN2021/099149, dated Sep. 7, 2021, 2 pgs.
International Search Report in the international application No. PCT/CN2021/099146, dated Sep. 7, 2021, 2 pgs.
International Search Report in the international application No. PCT/CN2021/099173, dated Aug. 26, 2021, 2 pgs.
English translation of the Written Opinion of the International Search Authority in the international application No. PCT/CN2021/099159, dated Sep. 8, 2021, 4 pgs.
English translation of the Written Opinion of the International Search Authority in the international application No. PCT/CN2021/099149, dated Sep. 7, 2021, 4 pgs.
First Office Action of the U.S. Appl. No. 17/464,886, dated Feb. 21, 2023, 32 pgs.
First Office Action of the European application No. 21773439.1, dated Feb. 24, 2023, 6 pgs.
English translation of the Written Opinion of the International Search Authority in the international application No. PCT/CN2021/099146, dated Sep. 7, 2021, 4 pgs.
English translation of the Written Opinion of the International Search Authority in the international application No. PCT/CN2021/099173, dated Aug. 26, 2021, 3 pgs.
First Office Action of the U.S. Appl. No. 17/445,300, dated Mar. 2, 2023, 59 pgs.
International Search Report in the international application No. PCT/CN2021/109442, dated Jan. 4, 2022, 3 pgs.
Notice of Allowance of the Chinese application No. 202110352509.2, dated Apr. 15, 2022, 7 pgs.
International Search Report in the international application No. PCT/CN2021/109515, dated Dec. 30, 2021, 2 pgs.

(56) References Cited

OTHER PUBLICATIONS

Notice of Allowance of the Chinese application No. 202110352499.2, dated Apr. 15, 2022, 8 pgs.
First Office Action of the U.S. Appl. No. 17/515,776, dated Mar. 3, 2023, 21 pgs.
International Search Report in the international application No. PCT/CN2021/109464, dated Dec. 30, 2021, 2 pgs.
Notice of Allowance of the Chinese application No. 202110327478.5, dated Apr. 25, 2022, 7 pgs.
"Enhancement of Fault Collection for Embedded RAM Redundancy Analysis Considering Intersection and Orphan Faults", Mar. 2018, Stefan Kristofik and Peter Malfik, Integration, The VLSI Journal North-Holland Publishing Company, Amsterdam, NL, vol. 62, pp. 190-204.
"On the Repair of Redundant RAM's", Mar. 1987, Chin-Long Wey and Fabrizion Lombardi, IEEE Transactions on Computer-Aided Design of Integrated Circuits and Systems, IEEE, USA, vol. CAD-06, No. 2, pp. 222-231.
Notice of Allowance of the U.S. Appl. No. 17/568,948, dated Aug. 30, 2023, 60 pages.
Non-Final Office Action of the U.S. Appl. No. 17/648,665, dated Aug. 28, 2023, 67 pages.
Non-Final Office Action of the U.S. Appl. No. 17/446,978, dated Aug. 21, 2023, 51 pages.
Notice of Allowance of the Chinese application No. 202010833678.3, dated Jun. 12, 2023, 4 pages with English abstract.
Notice of Allowance of the U.S. Appl. No. 17/445,300, dated Aug. 17, 2023, 65 pages.
Notice of Allowance of the Chinese application No. 202010832396.1, dated Jun. 12, 2023, 5 pages with English abstract.
Notice of Allowance of the Chinese application No. 202010832380.0, dated Jun. 12, 2023, 5 pages with English abstract.

\* cited by examiner

METHOD AND DEVICE FOR DETERMINING FAIL BIT REPAIR SCHEME

CROSS-REFERENCE TO RELATED APPLICATIONS

This application is a continuation of International Application No. PCT/CN2021/099146, filed on Jun. 9, 2021, which claims priority to Chinese Patent Application No. 202010832380.0, filed on Aug. 18, 2020. The disclosures of International Application No. PCT/CN2021/099146 and Chinese Patent Application No. 202010832380.0 are hereby incorporated by reference in their entireties.

TECHNICAL FIELD

The disclosure relates to the technical field of integrated circuits, and particularly to a method for determining a Fail Bit (FB) repair scheme and a device for determining an FB repair scheme.

BACKGROUND

With the rapid development of computer technologies, integrated circuit chips have played an increasingly important role in people's production and life. However, failure problems are inevitable during development, production and use of chips, and redundant circuits may usually be used for repair processing of FBs in the chips.

If presently available redundant circuits include more than one assignment that can really repair all FBs, it is considered that there is really a solution to redundant-circuit-based BF repair. When there is really a solution, at least one assignment solution may definitely be found, which is an optimal assignment method. Existing redundant circuit assignment methods are non-optimal.

It is to be noted that the information disclosed in BACKGROUND is only used to strengthen the understanding to the background of the disclosure and thus may include information that does not form the conventional art known to those of ordinary skill in the art.

SUMMARY

An objective of the disclosure is to provide a method for determining an FB repair scheme and a device for determining an FB repair scheme, to solve the problem that an optimal assignment solution to an FB in a chip to be repaired cannot be determined when there are limited redundant circuits.

According to an aspect of embodiments of the disclosure, there is provided a method for determining an FB repair scheme, which may include: a bank to be repaired of a chip to be repaired is determined, the bank to be repaired including multiple target repair areas; initial repair processing is performed on an FB in each of the target repair areas using a redundant circuit, the redundant circuit including a Redundant Word Line (RWL) and a Redundant Bit Line (RBL); a number of remaining RWLs and a number of remaining RBLs after the initial repair processing are acquired; responsive to that the number of remaining RWLs is greater than 0 and the number of remaining RBLs is greater than 0, a candidate repair sub-scheme for each target repair area is determined, and a candidate repair cost corresponding to each candidate repair sub-scheme is determined; and an integrated repair cost and target repair scheme for the bank to be repaired are determined according to respective candidate repair sub-schemes and candidate repair costs corresponding to the respective candidate repair sub-schemes, where the target repair scheme corresponds to a minimum integrated repair cost.

According to another aspect of embodiments of the disclosure, there is provided a device for determining an FB repair scheme, which may include a memory storing processor-executable instructions; and a processor configured to execute the stored processor-executable instructions to perform operations of: determining a bank to be repaired of a chip to be repaired, the bank to be repaired including multiple target repair areas; performing initial repair processing on an FB in each of the target repair areas using a redundant circuit, the redundant circuit including an RWL and an RBL; acquiring a number of remaining RWLs and a number of remaining RBLs after the initial repair processing; responsive to that the number of remaining RWLs is greater than 0 and the number of remaining RBLs is greater than 0, determining a candidate repair sub-scheme for each target repair area, and determine a candidate repair cost corresponding to each candidate repair sub-scheme; and determining an integrated repair cost and target repair scheme for the bank to be repaired according to respective candidate repair sub-schemes and candidate repair costs corresponding to the respective candidate repair sub-schemes, where the target repair scheme corresponds to a minimum integrated repair cost.

It is to be understood that the above general description and the following detailed description are only exemplary and explanatory and not intended to limit the disclosure.

BRIEF DESCRIPTION OF THE DRAWINGS

The accompanying drawings, which are incorporated in and constitute a part of this specification, illustrate embodiments consistent with the application and, together with the specification, serve to explain the principle of the disclosure. It is apparent that the drawings in the following descriptions are only some embodiments of the application, and those of ordinary skill in the art may also obtain other drawings according to these drawings without creative efforts. In the drawings.

DETAILED DESCRIPTION

In order to make the objectives, features, and advantages of the disclosure clearer and easier to understand, the disclosure will further be described below in detail in combination with the drawings and specific implementations.

Failure problems are inevitable during development, production, and use of chips, and redundant circuits may usually be adopted for repair processing of FBs in the chips. However, a present redundant circuit assignment method is non-optimal. For example, a Dynamic Random Access Memory (DRAM) may be divided into a cell region and a periphery region. The cell region includes many memory cells, so the memory cells may be grouped into banks.

Redundant circuits may be divided into two types of orthogonal straight lines, i.e., RBLs and RWLs. Repair ranges when redundant circuits repairs FBs are half-banks, and are limited in quantity. There are multiple banks in a chip, and if not all FBs in a half-bank of one repair range are repaired successfully, the chip is scrapped. At present, a common assignment method includes preferentially assigning RBLs for repair, and assigning RWLs for repair when there are not enough RBLs. When the existing assignment method is adopted, if there is really a solution, an assignment result may usually not repair all FBs successfully, resulting in scrapping of the whole chip and greatly reducing the yield.

Figure 1:
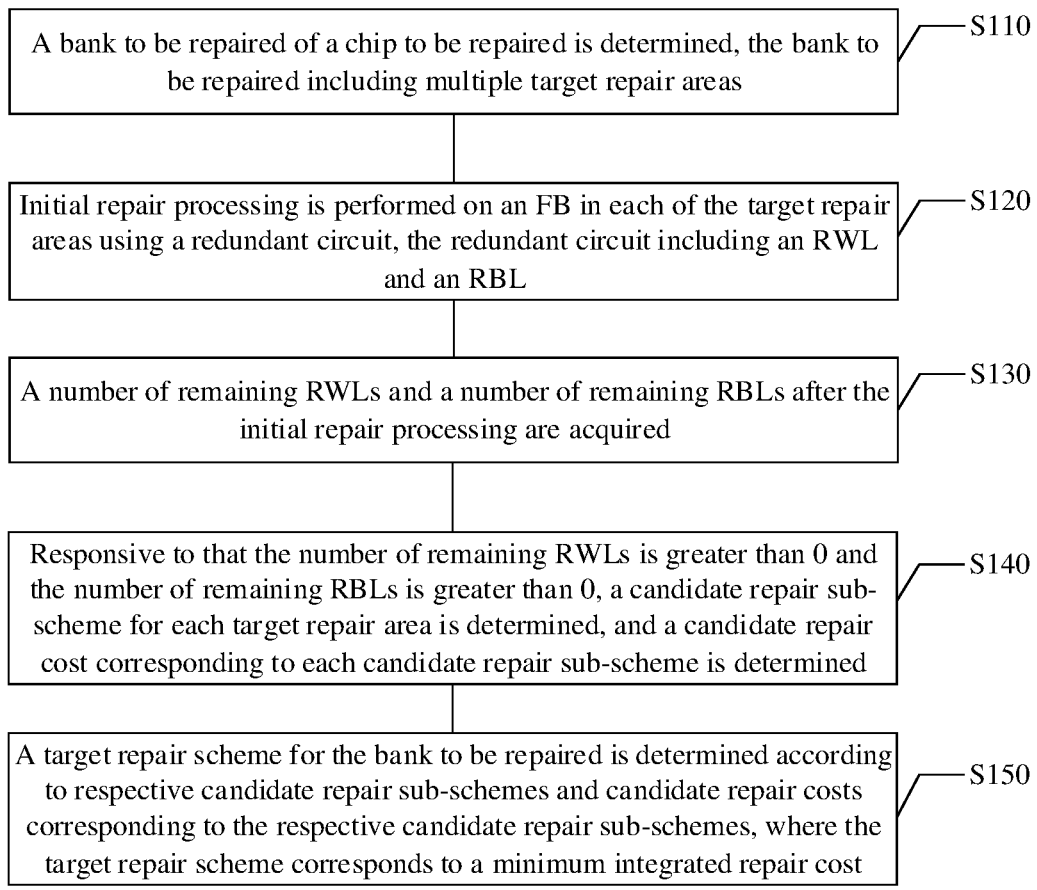
FIG. 1 schematically shows a flowchart of a method for determining an FB repair scheme according to an exemplary implementation of the disclosure.

Based on this, there is provided in an exemplary embodiment a method for determining an FB repair scheme at first. FIG. 1 schematically shows a flowchart of a method for determining an FB repair scheme according to some embodiments of the disclosure. Referring to FIG. 1, the method for determining an FB repair scheme may include the following operations.

In S110, a bank to be repaired of a chip to be repaired is determined, the bank to be repaired including multiple target repair areas.

In some exemplary embodiments of the disclosure, the chip to be repaired may be a chip with FBs existing in the cell region. The bank to be repaired may be a bank with FBs existing in memory cells. A repair range of the bank to be repaired may usually be a half-bank. Target repair areas may be multiple areas formed after the bank to be repaired is divided. One bank to be repaired may be divided into multiple target repair areas.

When an optimal assignment method of redundant circuits for a certain repair range in the chip is determined, the chip to be repaired may be acquired at first, and a bank to be repaired of the chip to be repaired is determined for repair processing using a redundant circuit.

Figure 2:
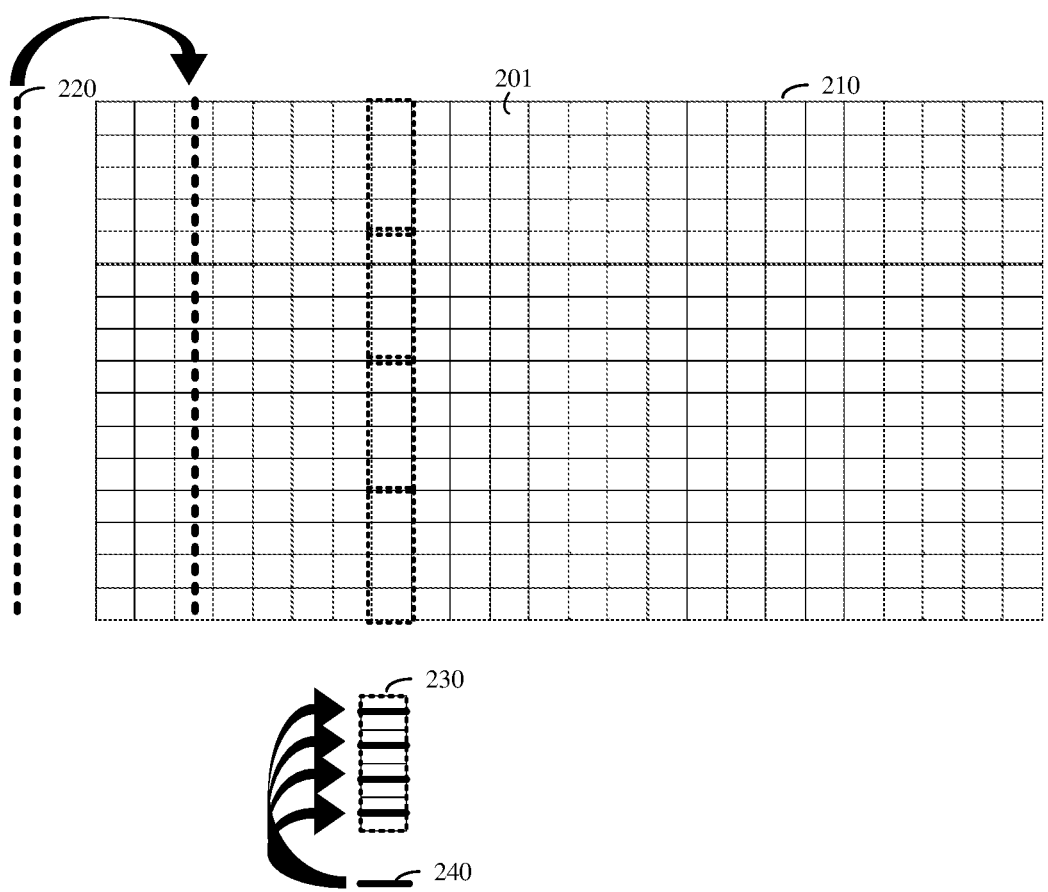
FIG. 2 schematically shows a line diagram of an initial bank to be repaired (half-bank) according to an exemplary implementation of the disclosure.

References are made to FIG. 2. FIG. 2 schematically shows a line diagram of an initial bank to be repaired (half-bank) according to an exemplary implementation of the disclosure. In FIG. 2, taking an initial bank to be repaired (i.e., half-bank) as an example, the initial bank to be repaired 210 may include multiple Data Queues (DQs) 201. Specifically, vertical and horizontal lines in the half-bank (210) may be represented by Word Lines (WLs) and Bit Lines (BLs) respectively. For example, a length of the WL may be continuous bits of 16 vertical continuous DQs, and a length of the BL may be continuous bits of one horizontal DQ. Rules for assigning redundant circuits to repair FBs are as follows. For RWLs 220, a repair range 210, i.e., a half-bank, includes $N_{RWL}$ RWLs, one RWL may be assigned to repair any WL in the half-bank, and a width of an RWL may be $w^{RWL}$ bits. For RBLs 240, vertical 4-DQs may be determined as a repair range 230, namely four continuous DQs may be determined as a repair range, every 4-DQ includes $N_{RBL}$ RBLs, and assigning the RBLs to repair BLs satisfies an appositional repair rule, namely one RBL may be assigned to repair any BL in its corresponding 4-DQs, BLs at the same positions in other DQs of the 4-DQs may also be repaired together, and assigned repair over non-corresponding 4-DQs is not allowed. A width of an RBL may be $w^{RBL}$ bits.

It is to be noted that specific numerical values of $N_{RWL}$, $N_{RBL}$, $w^{RWL}$, and $w^{RBL}$ in the disclosure are determined according to a product feature of the chip, and no special limits are made thereto in the disclosure.

According to some exemplary embodiments of the disclosure, an initial bank to be repaired of the chip to be repaired is determined, where the initial bank to be repaired includes initial WLs and initial BLs. A WL compression ratio and BL compression ratio of the initial bank to be repaired are acquired. Compression processing is performed on the initial WLs according to the WL compression ratio and compression processing is performed on the initial BLs according to the BL compression ratio, to form the bank to be repaired. The initial bank to be repaired may be a repair bank determined when repair processing is performed on the chip to be repaired. The initial WL may be a WL circuit in the initial bank to be repaired. The initial BL may be a BL circuit in the initial bank to be repaired. The WL compression ratio may be a compression ratio adopted for performing compression processing on the initial WLs in the initial bank to be repaired. The BL compression ratio may be a compression ratio adopted for performing compression processing on the initial BLs in the initial bank to be repaired. The bank to be repaired may be a repair bank formed after the compression processing is performed on the initial bank to be repaired.

Figure 3:
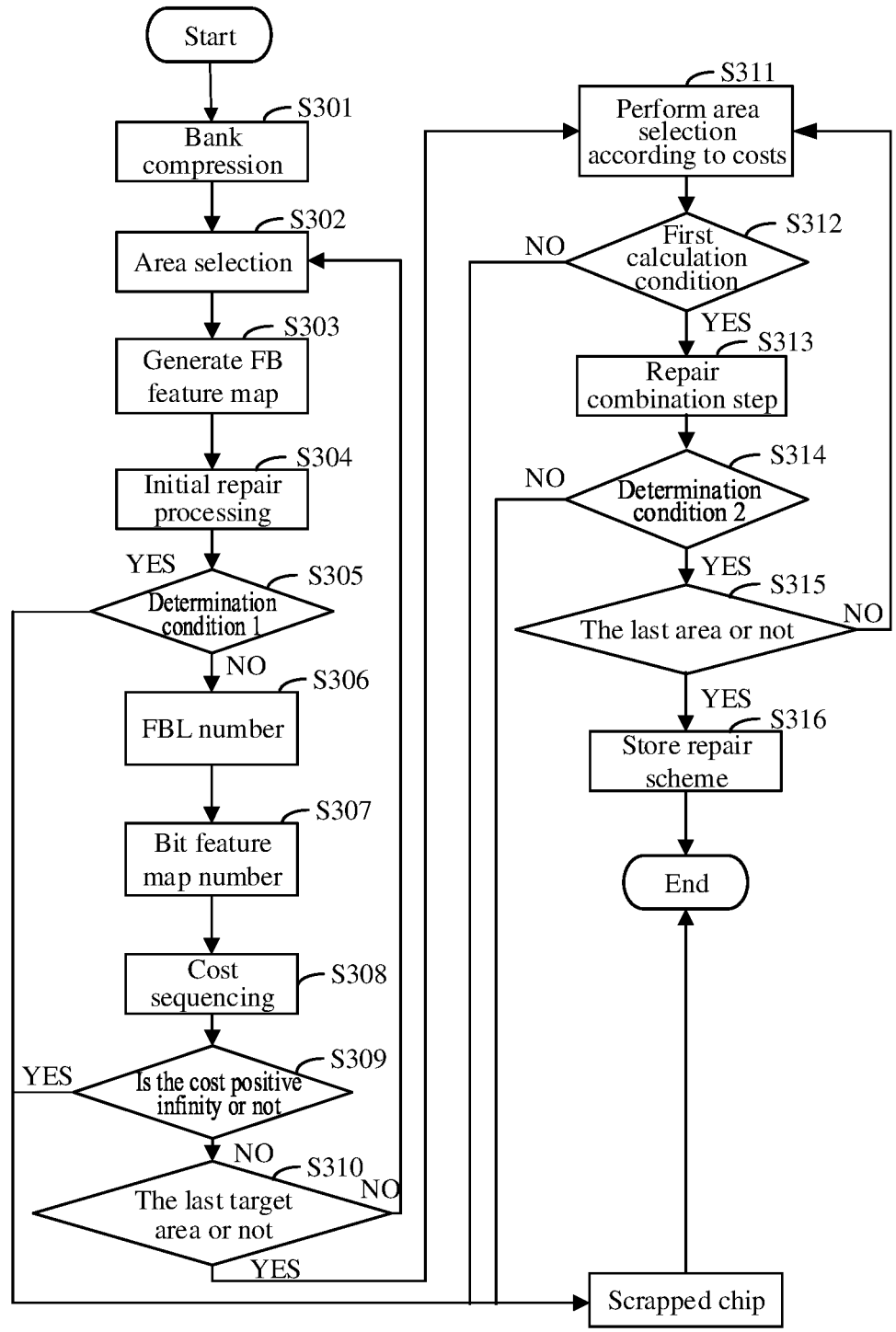
FIG. 3 schematically shows an overall flowchart of an optimal method for determining an FB repair scheme according to an exemplary implementation of the disclosure.
Figure 4:
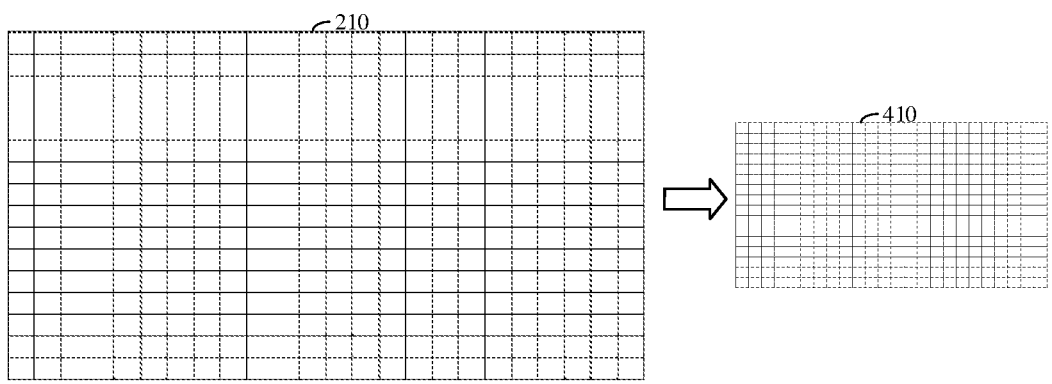
FIG. 4 schematically shows a change chart of performing compression processing on an initial bank to be repaired to form a bank to be repaired according to an exemplary implementation of the disclosure.

References are made to FIG. 3. FIG. 3 schematically shows an overall flowchart of an optimal method for determining an FB repair scheme according to an exemplary implementation of the disclosure. Before repair processing is performed on the chip to be repaired, for weakening the factor of the widths of the RWL and the RBL to make it unnecessary to consider the width of the redundant circuit during subsequent processing, in S301, compression processing may be performed on the initial bank to be repaired to form the bank to be repaired for a repair processing process. References are made to FIG. 4. FIG. 4 schematically shows a change chart of performing compression processing on an initial bank to be repaired to form a bank to be repaired according to an exemplary implementation of the disclosure. For example, the WL compression ratio and the BL compression ratio may be configured as $w^{RWL}$ and $w^{RBL}$ respectively. In FIG. 3, compression processing is performed on the initial WLs and initial BLs in the initial bank to be repaired 210 according to the WL compression ratio $w^{RWL}$ and the BL compression ratio $w^{RBL}$ respectively. When compression processing is performed, an OR operation may be performed. A value of an FB may be 1, and a value of a non-FB may be 0. After the compression processing is performed on the initial bank to be repaired 210, the bank to be repaired 310 may be formed, and the bank to be repaired is recorded as U. Performing the abovementioned compression processing process on the initial bank to be repaired to form the bank to be repaired may greatly reduce the number of bits in the original half-bank, reduce the processing time, and improve the processing efficiency.

According to some exemplary embodiments of the disclosure, a division column of the bank to be repaired is determined, where a width of the division column is determined according to a number of row-direction equivalent bits in a DQ after the compression processing. Column division processing is performed on the bank to be repaired according to the division column to form the multiple target repair areas. The division column may be a basic division unit adopted when division processing is performed on the initial bank to be repaired. The row-direction equivalent bits may be bits in each row in the DQ in the bank to be repaired formed after the compression processing is performed on the initial bank to be repaired.

Figure 5:
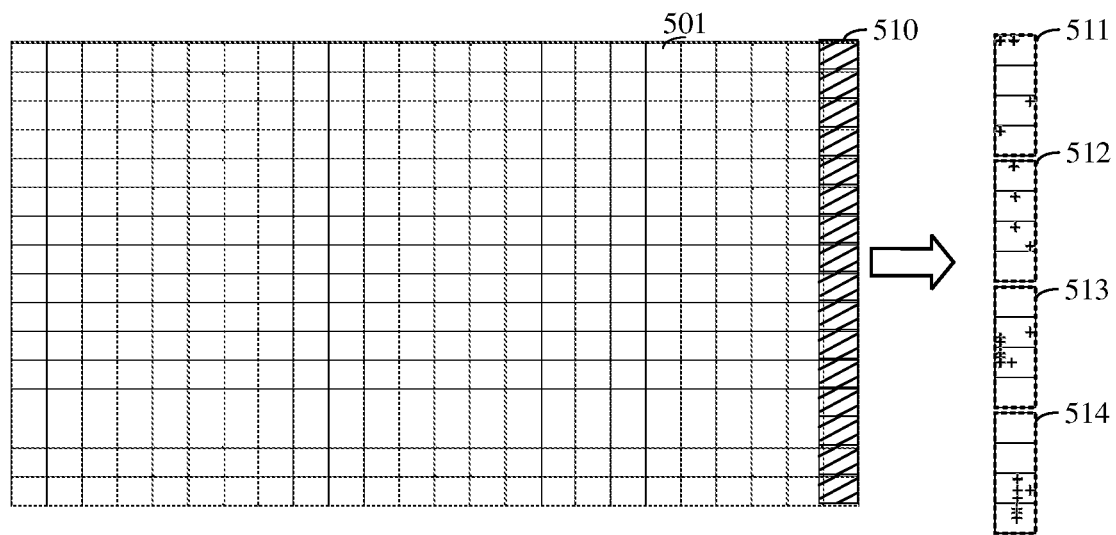
FIG. 5 schematically shows an FB map of a target repair area according to an exemplary implementation of the disclosure.

References are made to FIG. 5. FIG. 5 schematically shows an FB map of a target repair area according to an exemplary implementation of the disclosure. In FIG. 5, the bank to be repaired 510 may include multiple DQs 501. For example, in the disclosure, the division column of the bank to be repaired may be determined according to the width of the row-direction equivalent bits in the DQ. For example, a width of a vertical DQ 501 may be determined as the width of the division column, and all vertical DQs may be grouped as a target repair area. After the bank to be repaired is divided according to the division column, the target repair area may be an area formed by a row-direction DQ and all the vertical DQs. When column division processing is performed on the bank to be repaired according to the width of a row-direction equivalent bit, the bank to be repaired may be divided into the multiple target repair areas 510 to perform repair processing based on the target repair areas, so that the complexity of performing repair processing on the FBs using the redundant circuits may be reduced.

In S120, initial repair processing is performed on an FB in each of the target repair areas using a redundant circuit, the redundant circuit including an RWL and an RBL.

In some exemplary implementations of the disclosure, initial repair processing may be a process of performing repair processing using the RWL and the RBL according to a determined bit position after the FB in the target repair area is determined.

Referring to FIG. 5, repair processing may be performed on the target repair areas one by one. For example, areas to be processed 510, i.e., areas $A_r$, r=1, 2, . . . , n, may be sequentially selected from right to left, n being the number of the target repair areas, and repair processing is performed on the target repair areas one by one. FB may be adopted to represent a fail bit in the target repair area, namely a value thereof is 1, and non-FB may be adopted to represent a not fail bit in the target repair area, namely a value thereof is 0.

According to some exemplary embodiments of the disclosure, an FB feature map of the target repair area is determined. Initial repair processing is performed on the FB in each of the target repair areas using the redundant according to the FB feature map. The FB feature map may be a feature map obtained after abstract extraction is performed on the FB in the target repair area.

References are made to FIG. 3. In S302, one target repair area may be selected after the multiple target repair areas are generated. In S303, an FB feature map of the target repair area is generated. In S304, initial repair processing is performed on the FB in the target repair area using the redundant circuit according to the FB feature map.

According to some exemplary embodiments of the disclosure, the target repair area is divided into multiple basic repair areas, where the basic repair area includes a preset number of DQs. The basic repair areas are acquired, and bit states of all bits in the basic repair areas are determined. OR operation processing is performed on the bit states in every preset number of DQs, and FB maps of the basic repair areas are generated. The FB feature map is generated according to the FB maps corresponding to respective basic repair areas. The basic repair area may be a repair area formed after area division processing is performed on the target repair area. The basic repair area may include a preset number of DQs, and the preset number may be set according to a division requirement. For example, the preset number may be configured to 2, 4, and 8. No special limits are made thereto in the disclosure. The bit state may represent that each bit in the basic repair area is in a valid state or an invalid state. The FB map may be a feature map corresponding to each FB in the basic repair area.

When an RBL is adopted for repair processing, the appositional repair rule is satisfied, namely one RBL may be assigned to repair any BL in its corresponding 4-DQ. Therefore, the preset number may be configured to 4, and four DQs are determined as a basic repair area. For example, every four DQs may be determined as a basic repair area, and $B_{ri}$ may be adopted to represent the basic repair area, namely i-th 4-DQ in $A_r$. When a target repair area is determined, the target repair area may be divided into multiple basic repair areas, and bit states of all bits in each basic repair area are determined one by one. Referring to FIG. 5, "+" may be adopted to represent the FB in the basic repair area. After the target repair area 510 is divided, four basic repair areas are obtained, i.e., basic repair area 511, basic repair area 512, basic repair area 513, and basic repair area 514.

Figure 6:
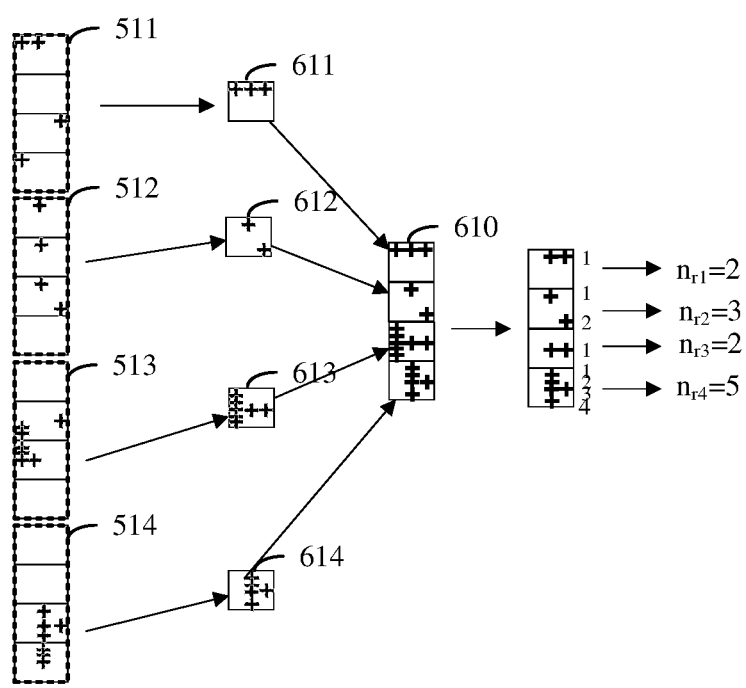
FIG. 6 schematically shows an FB feature map of a generated target repair area according to an exemplary implementation of the disclosure.

When the bit states in each basic repair area are determined, OR operation processing may be performed on the bit states in a basic repair area, including 0 or 0=0, 0 or 1=1, 1 or 0=1, and 1 or 1=1. For $\forall B_{ri} \in A_r$, the OR operation may be performed on each DQ in $B_{ri}$ to obtain an FB map, recorded as $M_{ri}$, until such processing is performed on all $B_{ri}$ in $A_r$. References are made to FIG. 6. FIG. 6 schematically shows a generated FB feature map of a target repair area according to an exemplary implementation of the disclosure. OR operation processing may be performed on FBs in each of basic repair area 511 to basic repair area 514 to obtain corresponding FB maps, i.e., FB map 611, FB map 612, FB map 613, and FB map 614 respectively. An FB feature map 610 corresponding to the target repair area may be generated by combining the FB maps of respective basic repair areas.

According to some exemplary embodiments of the disclosure, whether the FB feature map satisfies a preset condition is determined, the preset condition including a first preset condition and a second preset condition. Responsive to that the FB feature map satisfies the first preset condition, repair processing is performed on the FB using the RWL, the first preset condition including that a number of FBs of a first numbered WL in the basic repair area is greater than a present number of remaining RBLs in the basic repair area. Responsive to that the FB feature map satisfies the second preset condition, repair processing is performed on the FB using the RBL, the second preset condition including that a number of FBs of a first numbered BL in the basic repair area is greater than a present number of remaining RWLs in the basic repair area. The preset condition may be a condition for determining the redundant circuit to be adopted to repair the target repair area according to the FB feature map corresponding to the target repair area. When repair processing is performed on the FB, two redundant circuits, i.e., the RWL and the RBL, may be adopted for repair processing. The first preset condition, i.e., phenomenon 1, may be a corresponding preset condition when the RWL is adopted to perform repair processing on the FB. The second preset condition, i.e., phenomenon 2, may be a corresponding preset condition when the RBL is adopted to perform repair processing on the FB. The number of FBs of the first numbered WL may be the number of FBs in a j-th WL in $M_{ri}$, recorded as $N_{ij}^{FWL}$. The present number of remaining RBLs in the basic repair area may be the number of present available RBLs in $M_{ri}$, recorded as $N_{ri}^{RBL}$. The number of FBs of the first numbered BL may be the number of FBs in a j-th BL in $M_{ri}$, recorded as $N_{ij}^{FBLs}$. The present number of remaining RWLs may be the number of available RWLs left presently, recorded as $N_{RWL}^{(t)}$.

Figure 7:
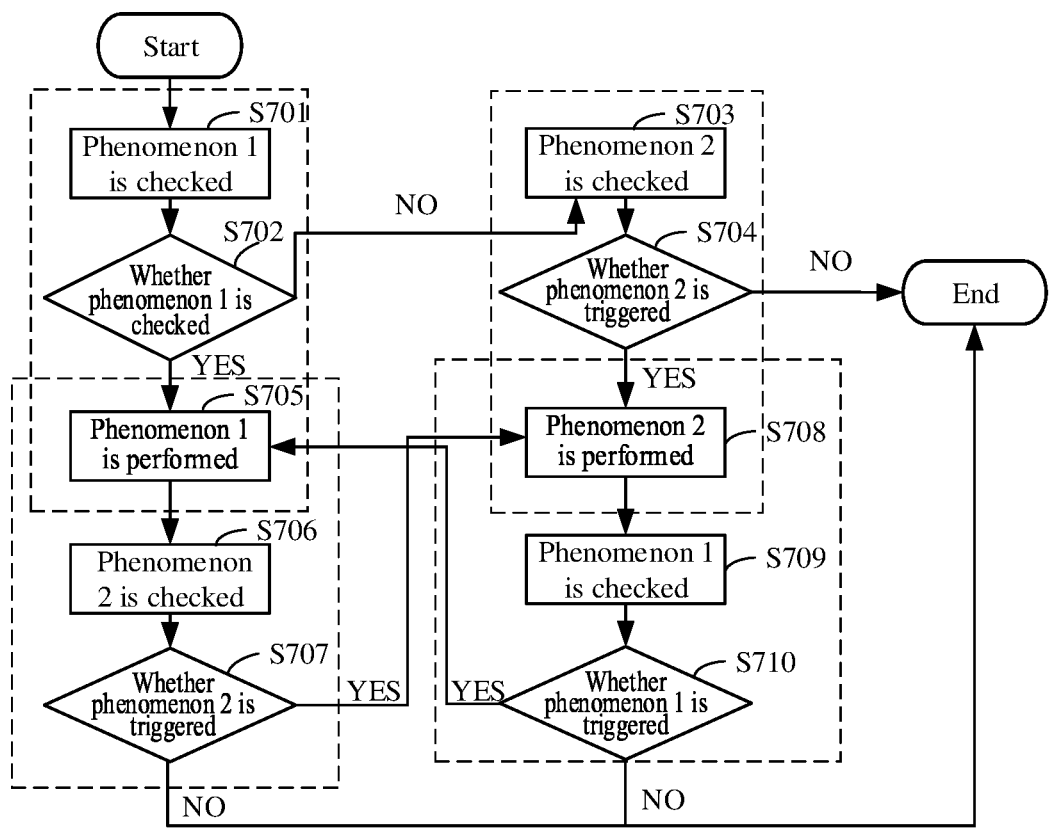
FIG. 7 schematically shows a flowchart of initial repair processing according to an exemplary implementation of the disclosure.

When the FB feature map of the target repair area is obtained, initial repair processing may be performed on the FB in the target repair area using the redundant circuit, namely Force Repair (FR) processing is performed. Referring to FIG. 7 which is a flowchart of initial repair processing according to an exemplary implementation of the disclosure, the following operations are specifically performed.

In S701 to S702, whether the determined FB feature map satisfies the first preset condition is determined. Responsive to that the FB feature map does not satisfy the first preset condition, namely phenomenon 1 is not triggered, S703 to S704 are performed, and whether phenomenon 2 is triggered is determined. Responsive to that it is determined that the FB feature map satisfies the first preset condition, namely phenomenon 1 is triggered, S705 is performed, namely WL repair processing is performed on the target repair area. Specifically, the first preset condition may be that the number of FBs of the first numbered WL in the basic repair area is greater than the present number of remaining RBLs in the basic repair area. For each basic repair area in the target repair area, namely $N_{ij}^{FWL} \in \forall M_{ri}$, when $N_{ij}^{FWL} > N_{ri}^{FBL}$, the WL at corresponding position j is repaired using the RWL. When WL repair is performed using the RWL, the present number of remaining RWLs correspondingly decreases, so the present number of remaining RWLs may be correspondingly updated when WL repair is performed, namely $N_{RWL}^{(t+1)} = N_{RWL}^{(t)} - n_{RWL}^{(t)}$, where $N_{RWL}^{(t)}$ represents the number of remaining available RWLs, t represents a present variable, t+1 represents a next variable, and $n_{RWL}^{(t)}$ may represent the number of RWLs that have been used in the target repair area. If $N_{RWL}^{(t+1)} < 0$, it indicates that there is no available RWL, and no RWL may be adopted for WL repair processing. In S706, whether the FB feature map satisfies the second preset condition may be continued to be determined.

In S707, responsive to that the FB feature map satisfies the second preset condition, namely phenomenon 2 is triggered, S708 is performed, namely BL repair processing is performed on the target repair area. Specifically, the second preset condition may be that the number of FBs of the first numbered BL in the basic repair area is greater than the present number of remaining RWLs in the basic repair area. For each basic repair area in the target repair area, namely $N_{ij}^{FBLs} \in \forall M_{ri}$, when $N_{ij}^{FBLs} > N_{RWL}^{(t)}$, the WL at corresponding position j is repaired using the RBL. When WL repair is performed using the RBL, the present number of remaining RBLs correspondingly decreases, so the present number of remaining RBLs may be correspondingly updated when WL repair is performed, namely $N_{RWL}^{(t+1)} = N_{RWL}^{(t)} - n_{RWL}^{(t)}$, where $N_{RWL}^{(t)}$ represents the number of remaining available RWLs, t represents the present variable, t+1 represents the next variable, and $n_{RWL}^{(t)}$ may represent the number of the RWLs that have been used in the target repair area. If $N_{RWL}^{(t+1)} < 0$, it indicates that there is no available RWL, and no RWL may be adopted for WL repair processing. whether the FB feature map satisfies the second preset condition may be continued to be determined. $N_{RBL}^{(t+1)} = N_{RBL}^{(t)} - n_{TBL}^{(t)}$, where $N_{RBL}^{(t)}$ represents the number of remaining available RBLs, t represents the present variable, t+1 represents the next variable, and $n_{RBL}^{(t)}$ may represent the number of RBLs that have been used in the target repair area. If $N_{RBL}^{(t+1)} < 0$, it indicates that there is no available RBL, and no RBL may be adopted for WL repair processing. In such case, in S709, whether the FB feature map satisfies the first preset condition may be continued to be cyclically determined, and responsive to that the FB feature map satisfies the first preset condition, namely phenomenon 1 is triggered, S710 is performed. Whether the FB feature map satisfies the first preset condition and the second preset condition is cyclically determined to perform repair processing on the FB in the target repair area.

It is to be noted that some chips to be repaired have been repaired after the initial repair processing, i.e., FR processing, and thus do not need subsequent operations, and for chips that are not completely repaired after the initial repair processing, repair operations after the initial repair processing are required to be continued. For a chip that is not completely repaired after the initial repair processing, the following processing operations may be continued to be performed.

In S130, a number of remaining RWLs and a number of remaining RBLs after the initial repair processing are acquired.

In some exemplary implementations of the disclosure, the number of remaining RWLs may be the number of RWLs left after the initial repair processing, and is recorded as $N_{RWL}^{(t+1)}$. The number of remaining RBLs may be the number $N_{RBL}^{(t+1)}$ of RBLs left after the initial repair processing.

After the initial repair processing, the number of remaining RWLs and the number of remaining RBLs may be acquired to determine whether to perform a next operation according to the number of remaining RWLs and the number of remaining RBLs. Specifically, if there are still FBs that repair processing is not performed after the abovementioned repair process, a repair scheme is determined through the following operations. In S305, determination condition 1 may be determined to determine whether the following operations. Specifically, determination condition 1 may be $N_{RBL}^{(t+1)} < 0$ or $N_{RBL}^{(t+1)} < 0$. If determination condition 1 is satisfied, the chip to be repaired is determined as a failed chip. If determination condition 1 is not satisfied, subsequent operations are continued to be performed. That is, if there are still remaining RWLs and remaining BLs in the bank to be repaired after the initial repair processing, a candidate repair sub-scheme for each target repair area and a corresponding candidate repair cost are determined.

In S140, responsive to that the number of remaining RWLs is greater than 0 and the number of remaining RBLs is greater than 0, a candidate repair sub-scheme for each target repair area is determined, and a candidate repair cost corresponding to each candidate repair sub-scheme is determined. The candidate repair sub-scheme may be a candidate repair scheme corresponding to each target repair area. The candidate repair cost may be a repair cost corresponding to each candidate repair sub-scheme. When both the number of remaining RWLs and the number of remaining RBLs are not less than 0, it indicates that there are still redundant circuits, and the candidate repair sub-scheme for each target repair area and the candidate repair cost corresponding to each candidate repair sub-scheme may be determined according to the remaining redundant circuits.

According to some exemplary embodiments of the disclosure, a repair vector corresponding to each target repair area in the bank to be repaired is initialized. The repair vector is updated using a hybrid carry system according to an FBL number combination. The candidate repair sub-scheme for each target repair area is determined according to the updated repair vector. The repair vector may be a representation vector adopted to represent specific repair processing to be performed on the target repair area, and is recorded as s. The vector s may represent that an RBL having a specific number will be used for repairing each FBL in each map. When a numerical value is 0, it indicates that no RBL is used for repair. The hybrid carry system may be a carry system adopted when repair schemes corresponding to different $M_{ri}$ in the target repair area are determined. For example, a target repair area may include four $M_{ri}$, i.e., $M_{r1}$, $M_{r2}$, $M_{r3}$, and $M_{r4}$. In such case, $M_{r1}$ of a first map adopts an $n_{r1}$-carry system, $M_{r2}$ of a second map adopts an $n_{r2}$-carry system, and so on. For example, in FIG. 6, $M_{r1}$ is binary, $M_{r2}$ is ternary, $M_{r3}$ is binary, and $M_{r4}$ is quinary. The FBL number combination may be a combination of serial numbers of FBLs repaired by RBLs in each map. In sequence positions of each map, except 0s, responsive to that a left number is more than or equal to a right number, the right number is equal to the left number plus 1 to ensure that the left number is less than the right number, and carry determination is performed on the FBL number. The candidate repair sub-scheme may be all possible repair sub-schemes corresponding to each target repair area. In the disclosure, all possible RBL repair schemes are listed, and the target repair scheme corresponding to a minimum target repair cost is determined according to all the possible candidate repair sub-schemes.

Before the candidate repair sub-scheme corresponding to the target repair area is determined, the repair vector corresponding to each target repair area in the bank to be repaired may be initialized at first. For example, a numerical value in the repair vector s may be initialized to 0. The repair vector s includes v 0s, where v may represent $$\sum_i N_{ri}^{RBL},$$

i.e., the number of remaining available RBLs in $M_{ri}$. $n_{r1}$, $n_{r2}$, $n_{r3}$, and $n_{r4}$ may represent vector values in $M_{r1}$, $M_{r2}$, $M_{r3}$, and $M_{r4}$ respectively, where $n_{r1}$ may include $n_{r11}$, $n_{r12}$, $n_{r13}$, $n_{r14}$, and so on, till $n_{r44}$. The numerical values in the vector are increased by 1 one by one from $n_{r11}$. The repair vector is updated using the hybrid carry system and the FBL number combination to obtain a new repair vector, and corresponding repair vector values are recorded. When values of all possible repair vectors are obtained, and the candidate repair sub-scheme for each target repair area may be determined according to all the obtained repair vectors According to some exemplary embodiments of the disclosure, the following operation steps are performed on each target repair area: the FB feature map of the target repair area is acquired; numbering processing is performed on FBLs according to the FB feature map to generate FBL numbers; a Map Combination Number (MCN) of the FB feature map is generated according to the FBL numbers; and the candidate repair cost is calculated according to the MCN. The FBL number may be a number corresponding to each FBL after numbering processing is performed on the FBL in the target repair area. The MCN may be a number determined according to the FBL numbers and corresponding to a feature map of each basic repair area. The MCN is for facilitating hybrid carry-based operation.

After the FB feature map of the target repair area is acquired, referring to FIG. 3, in S306, numbering processing may be performed on the FBLs of the basic repair area in the target repair area according to the FB feature map. Specifically, for $\forall M_{ri} \in A_r$, when $M_{ri}$ includes at least one FBL, for statistically counting the FBLs, $n^{FBL}$ may represent the number of FBs in the BL. $n^{FBL}$ may be assigned with an initial value 0, and when $M_{ri}$ includes an FB, a plus one operation may be performed on $n^{FBL}$ to determine the number of a BL including the FB. $n^{FBL}$ may represent the number of the FBL that is presently operated, and $y_l^{FBL}$ may represent a number value of each FBL in the feature map. Referring to FIG. 6, it may be obtained that the FBL numbers, i.e., the numbers of the FBLs, corresponding to respective basic repair areas are: 1; 1 and 2; 1; and 1, 2, 3 and 4 respectively. In S307, the MCN of the FB feature map may be determined according to the FBL numbers. The MCN may be recorded as $n_{ri}$. For $\forall M_{ri} \in A_r$, the MCN recorded as $n_{ri}$ may be equal to a maximum FBL number plus one, namely $n_{r1}=2$, $n_{r2}=3$, $n_{r3}=2$, and $n_{r4}=5$. In S308, the candidate repair cost may further be calculated according to the determined MCN.

According to some exemplary embodiments of the disclosure, a maximum FBL number of each basic repair area is determined according to the MCN. Responsive to that the target repair area satisfies a first calculation condition, the candidate repair cost of the target repair area is calculated, the first calculation condition including that the maximum FBL number of any basic repair area is less than or equal to a target calculated value. Responsive to that the target repair area does not satisfy the first calculation condition, the chip to be repaired is determined as a failed chip. The maximum FBL number may be a maximum number corresponding to the FB in a basic repair area, and the maximum FBL number is recorded as $\hat{n}_{ri}$, where $\hat{n}_{ri}=n_{ri}-1$. The first calculation condition may be a calculation condition adopted when the bank to be repaired may be repaired using the RBLs. The target calculated value may be a calculated value compared with the maximum FBL number in any basic repair area. The failed chip may be a chip that cannot be repaired using an existing redundant circuit.

After the maximum FBL number in each basic repair area is determined according to the MCN, whether the target repair area satisfies the first calculation condition may be determined. Responsive to that the MCN of each basic repair area in the target repair area satisfies the first calculation condition, the candidate repair cost of the target repair area is calculated. In S309, whether the candidate repair cost of the target repair area is equal to positive infinity is determined. Responsive to that the candidate repair cost of the target repair area is equal to positive infinity, the chip to be repaired is determined as a failed chip. Otherwise, S310 is continued to be performed to determine whether the target repair area is the last area. If YES, S311 is performed to sequence the calculated candidate repair costs. If NO, the next target repair area is continued to be acquired, and a candidate repair cost is calculated.

According to some exemplary embodiments of the disclosure, the present number of remaining RBLs of each basic repair area is acquired. The candidate repair cost of the target repair area and the first calculation condition are determined according to the maximum FBL number, the present number of remaining RBLs, the present number of remaining RWLs, and a maximum number of FBs repaired with each RWL in the target repair area. The present number of remaining RBLs may be the number of present available RBLs when repair processing is performed on the bank to be repaired. The present number of remaining RWLs may be the number of present available RWLs when repair processing is performed on the bank to be repaired.

When the present number of remaining RBLs of each basic repair area is acquired, the candidate repair cost of the target repair area and the first calculation condition are determined according to the maximum FBL number, the present number of remaining RBLs, the present number of remaining RWLs, and the maximum number of FBs repaired with each RWL in the target repair area, which are obtained in the abovementioned process, specifically as shown in formula 1.

$$c_r^- = \begin{cases} \prod_{M_{ri} \in A_r} \left[ \sum_{z=0}^{N_{ri}^{RBL}} \frac{\hat{n}_{ri}!}{z!(\hat{n}_{ri}-z)!} \right], & \text{if } \forall \hat{n}_{ri} \leq b_1 N_{RWL}^{(t)} + b_2 \\ \infty, & \text{otherwise} \end{cases} \quad \text{(Formula 1)}$$

Specifically, $b_1$ may represent $N_{ij}^{FWL} \in \forall M_{ri}$, i.e., the maximum number of FBs repaired with each RWL in $M_{ri}$. $b_2$ may represent the number of RBLs that may be assigned in the bit feature map of the present basic repair area. $c_r^-$ may represent the candidate repair cost of the target repair area. Responsive to that the target repair area does not satisfy the first calculation condition, it is determined that the candidate repair cost corresponding to the target repair area is equal to positive infinity, namely repair processing may not be performed thereon. In S312, the first calculation condition is determined. Responsive to that the first calculation condition is satisfied, a repair combination step, i.e., S131, is performed, namely all the possible candidate repair sub-schemes of the target repair area are determined according to the hybrid carry system and the MCN. Responsive to that the first calculation condition is not satisfied, the chip to be repaired is determined as a failed chip.

Figure 8:
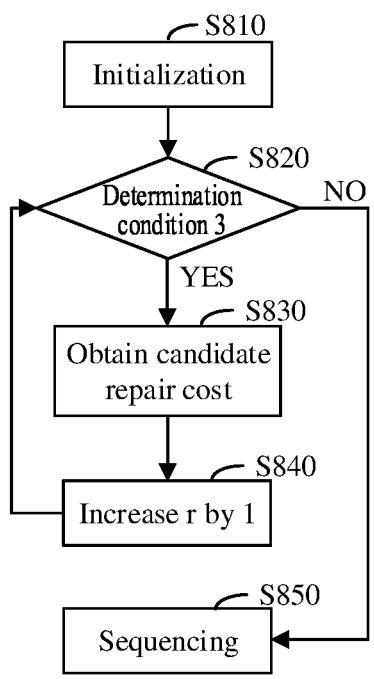
FIG. 8 schematically shows a flowchart of calculating a candidate repair cost of each target repair area according to an exemplary implementation of the disclosure.

References are made to FIG. 8. FIG. 8 schematically shows a flowchart of calculating a candidate repair cost of each target repair area according to an exemplary implementation of the disclosure. In S810, an initialization processing operation may be performed at first to initialize r=0 and $c_r^-$=0. After initialization is completed, S820 is performed, namely determination condition 3 is determined. Determination condition 3 is that $A_r \in U$ and $c_r^- \neq \infty$. If determination condition 3 is satisfied, S830 is performed to obtain the candidate repair cost corresponding to the target repair area. In S840, each target repair area is acquired one by one, and the operation in S820 is performed on each target repair area. If determination condition 3 is not satisfied, S850 is performed to sequence the calculated candidate repair costs.

In S150, an integrated repair cost and target repair scheme for the bank to be repaired are determined according to respective candidate repair sub-schemes and candidate repair costs corresponding to the respective candidate repair sub-schemes, where the target repair scheme corresponds to a minimum integrated repair cost.

In some exemplary implementations of the disclosure, the target repair scheme may be a repair scheme corresponding to the bank to be repaired. The integrated repair cost may be a repair cost obtained by integrating the candidate repair costs corresponding to respective candidate repair sub-schemes. Respective candidate repair sub-schemes may be integrated to obtain the target repair scheme. The target repair scheme corresponds to a minimum integrated repair cost. Before the target repair scheme for the bank to be repaired is determined, the candidate repair sub-scheme corresponding to each target repair area may be determined at first, each candidate repair sub-scheme is combined to obtain multiple target repair schemes, integrated repair costs corresponding to the multiple target repair schemes are calculated, and the target repair scheme corresponding to the minimum integrated repair cost may be determined to perform repair processing on the chip to be repaired according to the target repair scheme.

According to some exemplary embodiments of the disclosure, the candidate repair cost corresponding to each candidate repair sub-scheme is determined. Respective candidate repair costs are integrated to determine the integrated repair cost of the bank to be repaired. The minimum integrated repair cost is determined, and the repair scheme corresponding to the minimum integrated repair cost is determined as the target repair scheme. The integrated repair cost may be a repair cost corresponding to the bank to be repaired. The minimum integrated repair cost may be a repair cost with a minimum numerical value in the integrated repair costs corresponding to all the possible repair schemes of the bank to be repaired respectively. The target repair scheme may be the repair scheme corresponding to the minimum integrated repair cost, and repair processing is performed on the bank to be repaired using the target repair scheme.

After the bank to be repaired is divided into the multiple target repair areas, the candidate repair sub-scheme corresponding to each target repair scheme may be determined using the hybrid carry system according to the FBL number combination, the candidate repair sub-schemes of all the target repair areas and the candidate repair costs corresponding to each candidate repair sub-scheme may be integrated to obtain at least one integrated repair cost of repair processing for the bank to be repaired and determine the minimum integrated repair cost and the target repair scheme corresponding thereto, otherwise the chip to be repaired is determined as a failed chip.

According to some exemplary embodiments of the disclosure, responsive to that the present number of remaining RWLs is greater than a number of used RWLs, the at least one integrated repair cost is determined according to the present number of remaining RBLs, the number of used RBLs, and the number of used RWLs of the target repair area, and the minimum integrated repair cost is determined from the at least one integrated repair cost. The integrated repair cost may be a cost of performing repair processing on the bank to be repaired using the redundant circuit. The minimum integrated repair cost may be an integrated repair cost with a minimum repair cost numerical value in all the integrated repair costs.

Figure 9:
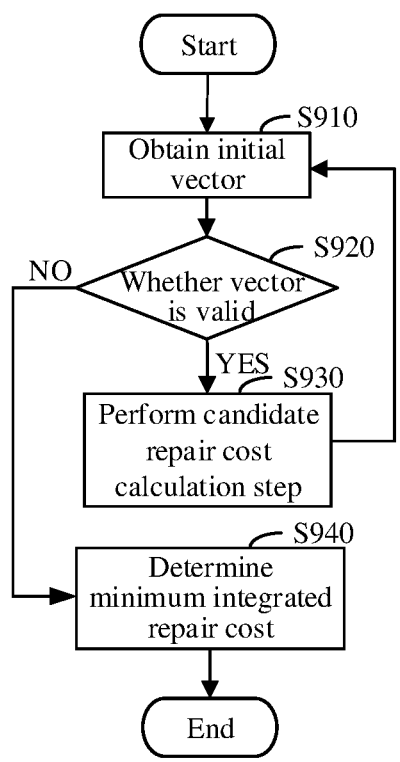
FIG. 9 schematically shows a flowchart of a repair combination step according to an exemplary implementation of the disclosure.
Figure 10:
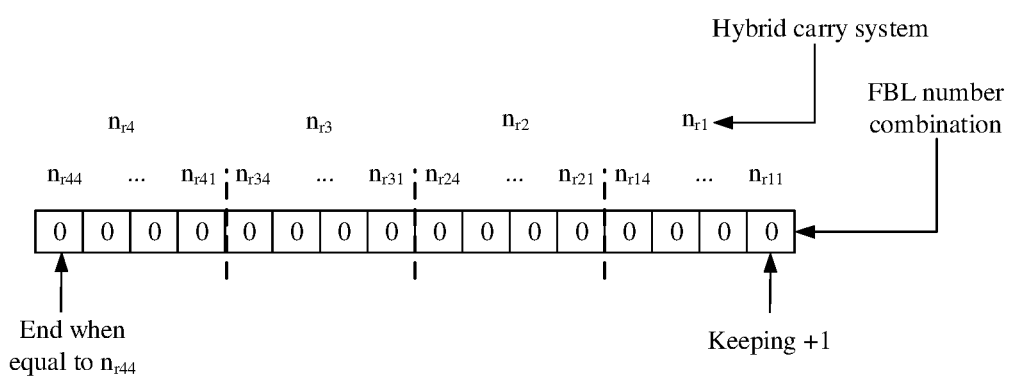
FIG. 10 schematically shows a schematic diagram of a hybrid carry system for determining a candidate repair sub-scheme according to an exemplary implementation of the disclosure.

References are made to FIG. 9. FIG. 9 schematically shows a flowchart of a repair combination step according to an exemplary implementation of the disclosure. In S910, the initialized vector s may be acquired at first. In S920, whether the vector s is valid is determined. If the vector s is valid, S930 is performed, namely a candidate repair cost calculation step is performed. If the vector s is invalid, S940 is performed to determine the minimum integrated repair cost. References are made to FIG. 10. FIG. 10 schematically shows a schematic diagram of a hybrid carry system for determining a candidate repair sub-scheme according to an exemplary implementation of the disclosure. Carry-based numbering processing shown in FIG. 10 may be performed according to s to obtain all possible combinations of the vector s.

Specifically, if the candidate repair cost corresponding to each target repair area is calculable, namely $c_r^- \neq \infty$, it is set that $h_1$=TRUE, otherwise $h_1$=FALSE, where $h_1$ is a Boolean variable, configured to assume whether the chip to be repaired may be repaired successfully. It is initially assumed that the chip to be repaired may be repaired successfully ($h_1$=TRUE), and a value obtained by operation is a determination about whether the chip may be finally repaired successfully. When $A_r \in U$ and $h_1$=TRUE, the candidate repair cost of each target repair area may be calculated through formula 1. If $c_r^- \neq \infty$, all possible vector values of the vector s may be acquired, and the integrated repair cost corresponding to each repair scheme is calculated through formula 2.

$$f^c(s, N_{RWL}^{(t)}) = \begin{cases} b_3 n_{RWL}^{(t)} + n_{RBL}^{(t)}, & \text{if } N_{RWL}^{(t)} - n_{RWL}^{(t)} \geq 0; \\ \infty, & \text{otherwise} \end{cases} \quad \text{(Formula 2)}$$

$b_3$ may be $$\sum_i N_{ri}^{RBL},$$

i.e., the total number of RBLs of each target repair area. $n_{RBL}^{(t)}$ may be the number of used RBLs of the target repair area, namely $$\sum_{q=0}^{v} \{1 \mid s_q > 0, s_q \in s\}.$$

After multiple integrated repair costs are calculated through formula 2, the minimum integrated repair cost may be calculated according to formula 3 to determine the target repair scheme corresponding to the minimum integrated repair cost and perform repair processing on the chip to be repaired using the target repair scheme.

$$c_r^{MIN} = \arg\min f^c(s, N_{RWL}^{(t)}) \quad \text{(Formula 3)}.$$

Herein, $N_{RWL}^{(t+1)} = N_{RWL}^{(t)} - n_{RWL}^{(t)}$.

Through the abovementioned calculation process, in S314, determination condition 2 may be determined. Determination condition 2 is $c_r^{MIN} < \infty$. If determination condition 2 is true, S315 is continued to be performed to determine whether the target repair area is the last area. If the target repair area is the last area, S316 is performed to store the corresponding target repair scheme. Otherwise, a target repair area is continued to be selected for determination. If determination condition 2 is false, the chip to be repaired is determined as a failed chip.

It is to be noted that terms "first", "second", etc., used in the disclosure are only for distinguishing different preset conditions and should not form any limit to the disclosure.

In the embodiments of the disclosure, on one aspect, an optimal assignment solution (i.e., an optimal repair scheme) may be determined according to repair costs corresponding to RWLs and RBLs respectively to minimize the repair cost of repairing the FB. On another aspect, BL positions and WL positions for initial repair processing may be directly determined in most cases to achieve a purpose of rapid repair. On a third aspect, the shortcoming that an assignment result obtained by an existing redundant circuit assignment method may not repair all FBs successfully when there is really a solution may be overcome, and the yield of the chip may be improved effectively. On a fourth aspect, for few related positions of FBs that initial repair processing may not be performed on, all possible repair sub-schemes may be inferred according to FB feature maps, and a target repair scheme may be determined, namely an integrated repair cost corresponding to the target repair scheme is minimum.

Figure 11:
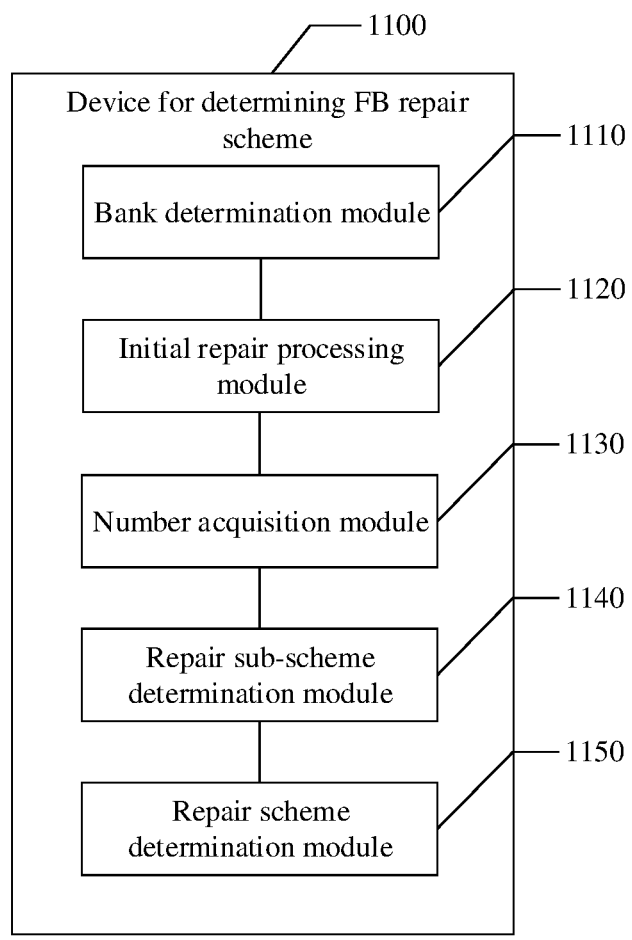
FIG. 11 schematically shows a block diagram of a device for determining an FB repair scheme according to an exemplary implementation of the disclosure.

In addition, there is also provided in an exemplary embodiment a device for determining an FB repair scheme. Referring to FIG. 11, the device for determining an FB repair scheme 1100 may include a bank determination module 1110, an initial repair processing module 1120, a number acquisition module 1130, a repair sub-scheme determination module 1140, and a repair scheme determination module 1150.

Specifically, the bank determination module 1110 is configured to determine a bank to be repaired of a chip to be repaired, the bank to be repaired including multiple target repair areas. The initial repair processing module 1120 is configured to perform initial repair processing on an FB in each of the target repair areas using a redundant circuit, the redundant circuit including an RWL and an RBL. The number acquisition module 1130 is configured to acquire a number of remaining RWLs and a number of remaining RBLs after the initial repair processing. The repair sub-scheme determination module 1140 is configured to, responsive to that the number of remaining RWLs is greater than 0 and the number of remaining RBLs is greater than 0, determine a candidate repair sub-scheme for each target repair area, and determine a candidate repair cost corresponding to each candidate repair sub-scheme. The repair scheme determination module 1150 is configured to determine a target repair scheme for the bank to be repaired according to respective candidate repair sub-schemes and candidate repair costs corresponding to the respective candidate repair sub-schemes, the target repair scheme corresponding to a minimum integrated repair cost.

The device for determining an FB repair scheme 1100 may directly determine BL positions and WL positions for initial repair processing in most cases to achieve a purpose of rapid repair. Moreover, repair processing is performed on the bank to be repaired using the redundant circuit, and an optimal assignment solution may be determined according to the repair costs corresponding to RWLs and RBLs respectively to minimize the repair cost of repairing the FB. The candidate repair sub-scheme for each target repair area is determined, so that the shortcoming that an assignment result obtained by an existing redundant circuit assignment method may not repair all FBs successfully when there is really a solution may be overcome, and the yield of the chip may be improved effectively.

In an exemplary implementation solution of the disclosure, the device for determining an FB repair scheme further includes a bank compression module, configured to: determine an initial bank to be repaired of the chip to be repaired, where the initial bank to be repaired includes initial WLs and initial BLs; acquire a WL compression ratio and BL compression ratio of the initial bank to be repaired; and perform compression processing on the initial WLs according to the WL compression ratio and perform compression processing on the initial BLs according to the BL compression ratio, to form the bank to be repaired.

In an exemplary implementation solution of the disclosure, the device for determining an FB repair scheme further includes an area division module, configured to determine a division column of the bank to be repaired, where a width of the division column is determined according to the number of row-direction equivalent bits in a DQ after the compression processing, and perform column division processing on the bank to be repaired according to the division column to form the multiple target repair areas.

In an exemplary implementation solution of the disclosure, the initial repair processing module includes an initial repair processing unit, configured to determine an FB feature map of the target repair area, and perform initial repair processing on the FB in each of the target repair areas using the redundant circuit according to the FB feature map.

In an exemplary implementation solution of the disclosure, the initial repair processing unit includes a feature map determination subunit, configured to: divide the target repair area into multiple basic repair areas, where the basic repair area includes a preset number of DQs; acquire the basic repair areas, and determine bit states of all bits in the basic repair areas; perform OR operation processing on the bit states in every preset number of DQs, and generate FB maps of the basic repair areas; and generate the FB feature map according to the FB maps corresponding to respective basic repair areas.

In an exemplary implementation solution of the disclosure, the initial repair processing unit includes an initial repair processing subunit, configured to: determine whether the FB feature map satisfies a preset condition, the preset condition including a first preset condition and a second preset condition; responsive to that the FB feature map satisfies the first preset condition, perform repair processing on the FB using the RWL, the first preset condition including that a number of FBs of a first numbered WL in the basic repair area is greater than a present number of remaining RBLs in the basic repair area; and responsive to that the FB feature map satisfies the second preset condition, perform repair processing on the FB using the RBL, the second preset condition including that a number of FBs of a first numbered BL in the basic repair area is greater than a present number of remaining RWLs in the basic repair area.

In an exemplary implementation solution of the disclosure, the repair sub-scheme determination module includes a repair sub-scheme determination unit, configured to initialize a repair vector corresponding to each target repair area in the bank to be repaired, update the repair vector using a hybrid carry system according to an FBL number combination, and determine the candidate repair sub-scheme for each target repair area according to the updated repair vector.

In an exemplary implementation solution of the disclosure, the repair sub-scheme determination unit includes a repair cost determination unit, configured to perform the following operation steps on each target repair area: acquiring the FB feature map of the target repair area; performing numbering processing on FBLs according to the FB feature map to generate FBL numbers; generating an MCN of the FB feature map according to the FBL numbers; and calculating the candidate repair cost according to the MCN.

In an exemplary implementation solution of the disclosure, the repair cost determination unit includes a repair cost determination subunit, configured to: determine a maximum FBL number of each basic repair area according to the MCN; responsive to that the target repair area satisfies a first calculation condition, calculate the candidate repair cost of the target repair area, the first calculation condition including that the maximum FBL number of any basic repair area is less than or equal to a target calculated value; and responsive to that the target repair area does not satisfy the first calculation condition, determine the chip to be repaired as a failed chip.

In an exemplary implementation solution of the disclosure, the repair cost determination subunit includes a repair cost calculation subunit, configured to acquire the present number of remaining RBLs of each basic repair area, and determine the candidate repair cost of the target repair area and the first calculation condition according to the maximum FBL number, the present number of remaining RBLs, the present number of remaining RWLs, and a maximum number of FBs repaired with each RWL in the target repair area.

In an exemplary implementation solution of the disclosure, the repair sub-scheme determination module includes a repair scheme determination unit, configured to: determine the candidate repair cost corresponding to each candidate repair sub-scheme; integrate respective candidate repair costs to determine an integrated repair cost of the bank to be repaired; and determine the minimum integrated repair cost, and determine the repair scheme corresponding to the minimum integrated repair cost as the target repair scheme.

In an exemplary implementation solution of the disclosure, the repair scheme determination unit includes a minimum cost determination subunit, configured to, responsive to that the present number of remaining RWLs is greater than a number of used RWLs, determine at least one integrated repair cost according to the present number of remaining RBLs, the number of used RBLs, and the number of used RWLs of the target repair area, and determine the minimum integrated repair cost from the at least one integrated repair cost.

Specific details about each virtual modules of the device for determining an FB repair scheme have been described in detail in the corresponding method for determining an FB repair scheme, and thus elaborations are omitted herein.

It is to be noted that, although a plurality of modules or units of the device for determining an FB repair scheme are mentioned in the above detailed descriptions, such division is not mandatory. In practice, features and functions of two or more modules described above may be embodied in one module or unit according to the implementations of the disclosure. Conversely, the feature and function of one module or unit described above may further be divided into multiple modules or units for embodiment.

In addition, the drawings are only schematic descriptions about processing in the method according to the exemplary embodiments of the disclosure and not for a purpose of limitation. It is easily understood that processing shown in the drawings does not indicate or limit the time sequence of the processing. In addition, it is also easily understood that such processing may be performed, for example, in multiple modules at the same time or at different time.

Other embodiments of the disclosure are apparent to those skilled in the art after considering the specification and practicing the disclosure disclosed here. The application is intended to cover any transformations, uses or adaptive variations of the disclosure, and these transformations, uses or adaptive variations follow the general principle of the disclosure, and include common general knowledge or conventional technical means undisclosed in the disclosure in the technical field. The specification and the embodiments are only considered as examples, and the practical scope and spirit of the disclosure are pointed out by the claims.

It should be understood that the disclosure is not limited to the precise structures described above and shown in the drawings, and various modifications and variations may be made without departing from the scope thereof. The scope of the disclosure is only defined by the appended claims.

The invention claimed is:

1. A method for determining a Fail Bit (FB) repair scheme, the method comprising:
   determining a bank to be repaired of a chip to be repaired, the bank to be repaired comprising multiple target repair areas, wherein the chip to be repaired comprises a plurality of banks comprising the bank to be repaired;
   performing initial repair processing on an FB in each of the multiple target repair areas using a redundant circuit, the redundant circuit comprising a Redundant Word Line (RWL) and a Redundant Bit Line (RBL);
   acquiring a number of remaining RWLs and a number of remaining RBLs after the initial repair processing;
   responsive to the number of remaining RWLs being greater than 0 and the number of remaining RBLs being greater than 0, determining a candidate repair sub-scheme for each of the multiple target repair areas, and determining a candidate repair cost corresponding to each candidate repair sub-scheme; and
   determining a target repair scheme for the bank to be repaired according to respective candidate repair sub-schemes and candidate repair costs corresponding to the respective candidate repair sub-schemes, wherein the target repair scheme corresponds to a minimum integrated repair cost,
   wherein determining the target repair scheme for the bank to be repaired according to the respective candidate repair sub-schemes and the candidate repair costs corresponding to the respective candidate repair sub-schemes comprises:
      acquiring the candidate repair cost corresponding to each candidate repair sub-scheme;
      integrating respective candidate repair costs to determine an integrated repair cost of the bank to be repaired; and
      determining the minimum integrated repair cost, and determining a repair scheme corresponding to the minimum integrated repair cost as the target repair scheme.

2. The method for determining an FB repair scheme of claim 1, further comprising: before determining the bank to be repaired of the chip to be repaired,
   determining an initial bank to be repaired of the chip to be repaired, wherein the initial bank to be repaired comprises initial Word Lines (WLs) and initial Bit Lines (BLs);
   acquiring a WL compression ratio and BL compression ratio of the initial bank to be repaired; and
   performing compression processing on the initial WLs according to the WL compression ratio and performing compression processing on the initial BLs according to the BL compression ratio, to form the bank to be repaired.

3. The method for determining an FB repair scheme of claim 1, further comprising: after determining the bank to be repaired of the chip to be repaired,
   determining a division column of the bank to be repaired, wherein a width of the division column is determined according to a number of row-direction equivalent bits in a Data Queue (DQ) after compression processing; and
   performing column division processing on the bank to be repaired according to the division column to form the multiple target repair areas.

4. The method for determining an FB repair scheme of claim 1, wherein performing the initial repair processing on the FB in each of the multiple target repair areas using the redundant circuit comprises:
   determining an FB feature map of each of the multiple target repair areas; and
   performing the initial repair processing on the FB in each of the multiple target repair areas using at least one of the RWL or the RBL according to the FB feature map.

5. The method for determining an FB repair scheme of claim 4, wherein determining the FB feature map of each of the multiple target repair areas comprises:
   dividing each of the multiple target repair areas into multiple basic repair areas, wherein each of the multiple comprises a preset number of Data Queues (DQs);
   acquiring the multiple basic repair areas, and determining bit states of all bits in the multiple basic repair areas;
   performing OR operation processing on the bit states in every preset number of DQs, and generating FB maps of the multiple basic repair areas; and
   generating the FB feature map according to the FB maps corresponding to respective ones of the multiple basic repair areas.

6. The method for determining an FB repair scheme of claim 4, wherein performing the initial repair processing on the FB in each of the multiple target repair areas using the at least one of the RWL or the RBL according to the FB feature map comprises:
   determining whether the FB feature map satisfies a preset condition, the preset condition comprising a first preset condition and a second preset condition;
   responsive to the FB feature map satisfying the first preset condition, performing repair processing on the FB using the RWL, wherein the first preset condition comprises that a number of FBs of a first numbered Word Line (WL) in a basic repair area is greater than a present number of remaining RBLs in the basic repair area, each of the multiple target repair areas being divided into multiple basic repair areas; and
   responsive to the FB feature map satisfying the second preset condition, performing repair processing on the FB using the RBL, wherein the second preset condition comprises that a number of FBs of a first numbered Bit Line (BL) in the basic repair area is greater than a present number of remaining RWLs in the basic repair area.

7. The method for determining an FB repair scheme of claim 1, wherein determining the candidate repair sub-scheme for each of the multiple target repair areas comprises:
   initializing a repair vector corresponding to each of the multiple target repair areas in the bank to be repaired;
   updating the repair vector using a hybrid carry system according to a Fail Bit Line (FBL) number combination; and determining the candidate repair sub-scheme for each of the multiple target repair areas according to the updated repair vector.

8. The method for determining an FB repair scheme of claim 1, wherein determining the candidate repair cost corresponding to each candidate repair sub-scheme comprises:
performing the following operation steps on each of the multiple target repair areas:
acquiring an FB feature map of the target repair area;
performing numbering processing on Fail Bit Lines (FBLs) according to the FB feature map to generate FBL numbers;
generating a Map Combination Number (MCN) of the FB feature map according to the FBL numbers; and
calculating the candidate repair cost according to the MCN.

9. The method for determining an FB repair scheme of claim 8, wherein calculating the candidate repair cost according to the MCN comprises:
determining a maximum FBL number of each of multiple basic repair areas according to the MCN, wherein each of the multiple target repair areas is divided into the multiple basic repair areas;
responsive to the target repair area satisfying a first calculation condition, calculating the candidate repair cost of the target repair area, wherein the first calculation condition comprises that the maximum FBL number of any basic repair area is less than or equal to a target calculated value; and
responsive to the target repair area not satisfying the first calculation condition, determining the chip to be repaired as a failed chip.

10. The method for determining an FB repair scheme of claim 9, wherein calculating the candidate repair cost of the target repair area comprises:
acquiring a present number of remaining RBLs of each of the multiple basic repair areas; and
determining the candidate repair cost of the target repair area and the first calculation condition according to the maximum FBL number, the present number of remaining RBLs, a present number of remaining RWLs, and a maximum number of FBs repaired with each RWL in the target repair area.

11. The method for determining an FB repair scheme of claim 1, wherein determining the minimum integrated repair cost comprises:
responsive to a present number of remaining RWLs being greater than a number of used RWLs, determining at least one integrated repair cost according to a present number of remaining RBLs, a number of used RBLs and the number of used RWLs of each of the multiple target repair areas; and
determining the minimum integrated repair cost from the at least one integrated repair cost.

12. A device for determining a Fail Bit (FB) repair scheme, comprising:
a memory storing processor-executable instructions; and
a processor configured to execute the stored processor-executable instructions to perform operations of:
determining a bank to be repaired of a chip to be repaired, the bank to be repaired comprising multiple target repair areas, wherein the chip to be repaired comprises a plurality of banks comprising the bank to be repaired;
performing initial repair processing on an FB in each of the multiple target repair areas using a redundant circuit, the redundant circuit comprising a Redundant Word Line (RWL) and a Redundant Bit Line (RBL);
acquiring a number of remaining RWLs and a number of remaining RBLs after the initial repair processing;
responsive to the number of remaining RWLs being greater than 0 and the number of remaining RBLs being greater than 0, determining a candidate repair sub-scheme for each of the multiple target repair areas, and determining a candidate repair cost corresponding to each candidate repair sub-scheme; and
determining a target repair scheme for the bank to be repaired according to respective candidate repair sub-schemes and candidate repair costs corresponding to the respective candidate repair sub-schemes, wherein the target repair scheme corresponds to a minimum integrated repair cost
wherein the processor is configured to execute the stored processor-executable instructions to perform further operations of:
acquiring the candidate repair cost corresponding to each candidate repair sub-scheme;
integrating respective candidate repair costs to determine an integrated repair cost of the bank to be repaired; and
determining the minimum integrated repair cost, and determining a repair scheme corresponding to the minimum integrated repair cost as the target repair scheme.

13. The device for determining an FB repair scheme of claim 12, wherein the processor is configured to execute the stored processor-executable instructions to perform further operations of: before determining the bank to be repaired of the chip to be repaired,
determining an initial bank to be repaired of the chip to be repaired, wherein the initial bank to be repaired comprises initial Word Lines (WLs) and initial Bit Lines (BLs);
acquiring a WL compression ratio and BL compression ratio of the initial bank to be repaired; and
performing compression processing on the initial WLs according to the WL compression ratio and performing compression processing on the initial BLs according to the BL compression ratio, to form the bank to be repaired.

14. The device for determining an FB repair scheme of claim 12, wherein the processor is configured to execute the stored processor-executable instructions to perform further operations of: after determining the bank to be repaired of the chip to be repaired,
determining a division column of the bank to be repaired, wherein a width of the division column is determined according to a number of row-direction equivalent bits in a Data Queue (DQ) after compression processing; and
performing column division processing on the bank to be repaired according to the division column to form the multiple target repair areas.

15. The device for determining an FB repair scheme of claim 12, wherein performing the initial repair processing on the FB in each of the multiple target repair areas using the redundant circuit comprises:
determining an FB feature map of each of the multiple target repair areas; and
performing the initial repair processing on the FB in each of the multiple target repair areas using at least one of the RWL or the RBL according to the FB feature map.

16. The device for determining an FB repair scheme of claim 15, wherein determining the FB feature map of each of the multiple target repair areas comprises:
- dividing each of the multiple target repair areas into multiple basic repair areas, wherein each of the multiple basic repair areas comprises a preset number of Data Queues (DQ)s;
- acquiring the multiple basic repair areas, and determining bit states of all bits in the multiple basic repair areas;
- performing OR operation processing on the bit states in every preset number of DQs, and generating FB maps of the multiple basic repair areas; and
- generating the FB feature map according to the FB maps corresponding to respective ones of the multiple basic repair areas.

17. The device for determining an FB repair scheme of claim 15, wherein performing the initial repair processing on the FB in each of the multiple target repair areas using the at least one of the RWL or the RBL according to the FB feature map comprises:
- determining whether the FB feature map satisfies a preset condition, the preset condition comprising a first preset condition and a second preset condition;
- responsive to the FB feature map satisfying the first preset condition, performing repair processing on the FB using the RWL, wherein the first preset condition comprises that a number of FBs of a first numbered Word Line (WL) in a basic repair area is greater than a present number of remaining RBLs in the basic repair area, each of the multiple target repair areas being divided into multiple basic repair areas; and
- responsive to the FB feature map satisfying the second preset condition, performing repair processing on the FB using the RBL, wherein the second preset condition comprises that a number of FBs of a first numbered Bit Line (BL) in the basic repair area is greater than a present number of remaining RWLs in the basic repair area.

18. The device for determining an FB repair scheme of claim 12, wherein determining the candidate repair sub-scheme for each of the multiple target repair areas comprises:
- initializing a repair vector corresponding to each of the multiple target repair areas in the bank to be repaired;
- updating the repair vector using a hybrid carry system according to a Fail Bit Line (FBL) number combination; and
- determining the candidate repair sub-scheme for each of the multiple target repair areas according to the updated repair vector.

19. The device for determining an FB repair scheme of claim 13, wherein determining the candidate repair cost corresponding to each candidate repair sub-scheme comprises:
- performing the following operation steps on each of the multiple target repair areas:
- acquiring an FB feature map of the target repair area;
- performing numbering processing on Fail Bit Lines (FBLs) according to the FB feature map to generate FBL numbers;
- generating a Map Combination Number (MCN) of the FB feature map according to the FBL numbers; and
- calculating the candidate repair cost according to the MCN.

* * * * *